UNITED STATES PATENT OFFICE 2,340,761

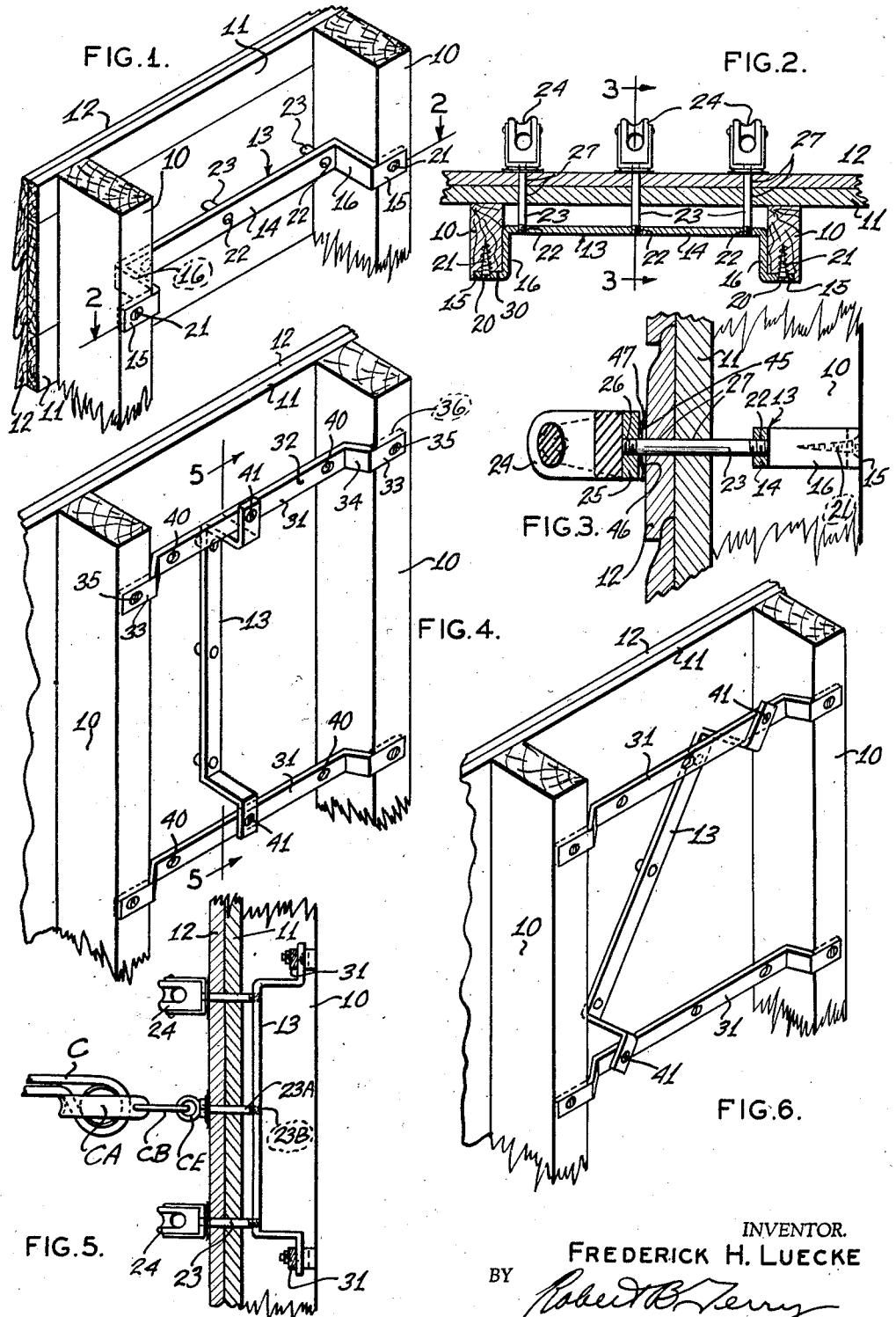

ANCHORAGE FOR ELECTRIC SERVICE CONDUCTORS

Frederick H. Luecke, Fort Wayne, Ind.

Application October 26, 1940, Serial No. 363,063

4 Claims. (Cl. 174—149)

This invention relates to improvements in anchorages for electric service conductors, and more particularly to an improved anchorage assembly of built-in type, for use with the wall elements of buildings or the like, to support and receive the strain from one or a plurality of electric service wires.

The usual and prevailing practice in the installation of service connections to a residence or other structure, is to install, entirely exteriorly of the building wall, a service rack, or separate spool or strain type insulators. However, for a number of years past this practice has resulted in a number of difficulties, the most objectionable of which is perhaps the tendency of such entirely external anchorage expedients to be pulled away from the siding, weatherboarding, or like wall elements under conditions of extraordinary tension on the service conductors. Such conditions of unusual tension arise by reason of high winds, extraordinary sleet loading, and the weighting effect of tree limbs and the like on the service wires. Under such conditions, when the service conductors are put under high tension, not only is the continuity of energy supply to the building apt to be interrupted, but more often than not the weatherboarding, siding, cornice, eaves structure or other building appurtenances to which the strain connection is made, is destructively affected, sometimes requiring replacement at the expense of the operating utility supplying the current. It is accordingly a major and general objective of the present invention to provide a more secure, and yet inexpensive anchorage, which is preferably of built-in type, for use in the zone of attachment of service conductors to a building wall or the like.

Yet another object of the invention is attained in a device of the type and for the purpose above generally referred to, which derives its support and anchorage from the major skeletal elements of the building wall structure, such as joists or studs, rather than merely from the sheeting, siding, weatherboarding or the like, which is more readily subjected to damage from the causes above named.

A still further object of the invention is attained in a novel provision for obviating a frequent cause of damage to the external surface of buildings, namely, rust stains and the like occurring after a period of use, and arising from the rusting effects of various metal parts in the service drop assemblies heretofore employed.

Yet another objective of the invention is attained in a novel type of built-in service drop anchorage, such that the assembly readily lends itself to either a horizontal or vertical arrangement of conductors and insulators for the reception of service conductors, or as may be desired, may be adapted readily, without necessitating any alteration or addition of parts, to any of a plurality of angle mountings.

A further object, somewhat ancillary to the foregoing, is attained in an improved design of built-in service drop anchorage which may be constructed entirely of stock materials, readily obtainable in the metal markets, and requiring no special equipment or unusual machine work.

The foregoing and numerous other objects will more clearly appear from the following detailed description of certain presently preferred embodiments, considered in connection with the accompanying drawing, in which:

Fig. 1 is an elevation in perspective, showing an arrangement of the wall-contained portions of an assembly as utilized for a horizontal mounting of strain elements for service wire anchorage; Fig. 2 is a horizontal sectional elevation as viewed along line 2—2 of Fig. 1; Fig. 3 is a fragmentary view of portions of the assembly of Figs. 1 and 2, and as viewed along line 3—3 of Fig. 2; Fig. 4 is an elevation in perspective, similar to Fig. 1, but showing a somewhat modified arrangement of parts as utilized in a vertically aligned arrangement of conductors and insulators; Fig. 5 is a vertical sectional elevation as taken along line 5—5 of Fig. 4, and illustrating the adaptability of the assembly for use with a cable anchoring device exclusively of or in conjunction with the more usual forms of service wire insulators, and Fig. 6 is a view similar to Fig. 4, but showing the primary support of the assembly as arranged for an angle mounting of the several service conductors.

Referring now by characters of reference to the drawing, Fig. 1 is illustrative of a typical form of installation of the assembly embodying present improvements, as built into a wall structure. The latter includes a plurality of stud elements or wall joists 10, to which are nailed the sheeting elements 11, over which are in turn applied the weatherboarding, siding or other wall finishing elements 12. Although by way of example, the arrangement is shown as applied in and to a building wall primarily of wood construction, the principles are equally applicable to substantially any conventional wall structure, particularly and preferably one characterized by the internal studding or wall joist elements 10 hereinafter for brevity referred to as studding or stud elements. The use, for example, of the improvements in a brick veneer structure of a residence or other building, would affect only the length of pin elements or equivalent support for the insulators or cable anchorage, all hereinafter more particularly described.

In the arrangement of Fig. 1, a primary supporting member for the insulators, through their pin elements, consists of a strap, strip or bar, indicated generally at 13. The strap 13 may be referred to for convenience as preferably of drop-center type, by which is meant that the elongate body portion 14 lies in a plane parallel to but offset from a pair of terminal portions 15, these being connected to the body 14 by end faces 16. The terminal portions 15 are apertured as at 20, and these apertures are countersunk from the outer faces of the terminals, for the flush reception of the heads of securing screws 21, each engaging one of the stud elements 10, as will best appear from Fig. 2.

By preference the body portion 14, being the drop center portion of the bar 13, is provided with a row of spaced, tapped apertures 22, each for the reception of a tension pin 23 threadedly engaging the tapped apertures. The pins 23 may consist of insulator pins or studs, and in case separate service wires (not shown) are utilized in lieu of a cable or the like, each such wire will be tied to one of the insulators 24. The latter, forming of themselves no part of the present invention, apart from the combination, require no detail of description but it may be noted for completeness and as a preference that each of the insulators 24 includes a porcelain body suitably bonded to a metal base 25, apertured and tapped as at 26 to receive an outer threaded end of the associated pin 23. The pins 23, as will be obvious from the drawing, all project through drilled apertures 27 in the sheeting 11 and sliding 12.

The installation of the primary anchorage or supporting bars, as well as the secondary supporting bars hereinafter described, is preferably made at the time of erection of the building, so as to lie entirely within a wall thereof and so as to be concealed from view. Since the lath, whether metal or wood, or the plasterboard or like provision for the inner surfacing of the wall, is usually directly secured to the inner edges of the studding 10, it is advantageous that the terminal portions 15 of the primary anchor bar be recessed in the outer edges of the studs, substantially as shown by Figs. 1 and 2 wherein provision is made through an undercut or shoulder portion 30 in each of the studs 10 so that the terminals 15 lie flush with the normal edge face of the studs, thus causing no protuberance or unsightly projection on the interior wall surface of the room.

The manner of installation of the arrangement shown by Figs. 1 and 2 will now appear as obvious, and as consisting, preferably, in a step of drilling the pin openings 27, inserting the pins preferably with insulators or cable anchorages affixed thereto exteriorly of the wall, then locating the primary supporting bar 13, then forming the shouldered or undercut portions 30 in the studs and affixing the bar thereto as by screws 21. It will be noted that in this arrangement, as well as other minor modifications thereof hereinafter described, all of those parts of the assembly which lie interiorly of the wall structure, are disposed entirely between the spaced parallel planes coincident with the outer and inner edge surfaces of the studs 10.

Figs. 4 and 5 illustrate a minor modification of the arrangement heretofore described, when it is desired to arrange the several service conductors in a substantially vertical plane, usually referred to as a vertical mount or mounting. In such case, there are employed a pair of secondary supporting or anchoring elements in the form of straps of metal, each indicated generally at 31. These are arranged in bridging relation to adjacent studs 10, and the several secondary straps each includes a drop center portion or body 32, terminals 33, and preferably acute angle connecting portions 34 which unite the terminals 33 to the body 32. Screws 35 or the like occupy countersunk recesses (not shown) in a manner which may be identical with the parts 20 of primary supporting straps 13, so that the heads of screws 35 lie flush with the outer surfaces of the terminals 33, and also do not project beyond the plane of the inner faces of the studs 10. In installation of the secondary supporting bars 31, the studs 10 are provided with suitable recessed or undercut portion 36 (Fig. 4), similar to those shown at 30 for the reception of the ends of bar 13.

Each of the secondary supporting elements 31 is provided with a row of openings 40, preferably three in number, and arranged as are the openings 22, with one opening located centrally of each bar or strap, and the others equidistantly on each side thereof. As desired, the openings 40 map be tapped or threaded or may be left smooth for the reception, selectively, of bolts 41 serving to connect the ends of the primary supporting bar 13 with the intermediate portions of the spaced pair of secondary supporting bars 31 as shown by Fig. 4. In this arrangement the pins 23 project through suitable drilled and tapped apertures therefor in the same manner as shown by Fig. 2 and above described.

It will have appeared from the row of openings 40 provided in each of the secondary supporting bars 31 that, by spacing the secondary bars 31 somewhat more closely together than in the case of the vertical mounting of Fig. 4, the arrangement lends itself readily to an angle mounting of the insulator pins and conductors. Thus by locating the primary supporting bar at an acute angle as shown by Fig. 6, and in bridging relation to relatively opposite openings 40 of the upper and lower secondary bars, two different angle mounting arrangements are selectively provided for, one of which is shown by Fig. 6. It will have appeared that in the arrangement employing the paired secondary supporting bars 31 in bridging relation to the studs 10, that by reason of the drop center construction of bar 13, the entire bar assembly lies entirely between the inner and outer wall elements.

Utility companies providing electric service, have heretofore prevalently experienced a difficulty in service drop connections, particularly the building anchorages therefor. This difficulty arises from the use of insulator bolts, pins and the like of a ferrous metal, which, after a period of usage, will rust, so that the effect of moisture and rust results in a highly objectionable stain or streak, particularly on painted siding or weatherboarding which is light in color. The multiplicity of streaks resulting from rusting parts, has frequently been a source of complaint, sometimes of claims for damages or for cost of repainting. The present improvements include an inexpensive and practical provision for obviating the difficulty above referred to. The physical embodiment of the means for overcoming rust streaks is found in the present example in the provision of a resilient annulus or washer, indicated generally at 45 and shown in section by Fig. 3 as including a central body, a down-turned annular portion 46 and an upturned skirt or lip portion 47. By preference one of the washers such as 45 is located on each of the pins 23 immediately behind the associated insulator, or cable anchorage if the latter be employed, so as to serve the purpose of a shield, which because of its outturned margin 47, serves in great measure to prevent the drippage of rust-carrying water from rain or condensation, down along the adjacent weatherboarding or siding 12. The washer serves also a structural purpose in that it operates as a distance element to keep the base 25 of the insulator 24 desirably spaced from the weatherboarding or the like 12, tending thereby to prevent drippage from the insulator down along the siding. The washer or annulus 45 is preferably constructed of copper or copper alloy, may be formed of other non-rusting metal of a relatively thin-gauge, pressed construction, so that it exhibits a fair resilience, and yet is of sufficient resistance when under compression, to act both as a spacer and as a lock washer, its resilient property thus serving to keep the threaded connections between pins 23, bar 13 and insulator base 25, from loosening under the effect of vibration or windage effects on the service conductors.

For brevity of description and as representing the most common form of usage, the improvements have been described thus far as applicable to a combination including the several tie-in or strain insulators exemplified at 24. The built-in structural features of the present design are, however, equally applicable for the anchoring retention of a service connection exemplified in Fig. 5 as including a multiple conductor cable C, and a cable anchorage CA, which is provided with a bail CB in connection with an eye CE. The eye CE is or may be formed integrally with the shank portion of a pin 23A connected, for example, as through threads 23B with the primary bar or strap element 13. The arrangement described may be used exclusively of additional pins 23, or in combination therewith, which pins are arranged to receive the insulators 24 as above described. The cable anchorage illustrated forms of itself no part of the present invention, and hence need not be described in detail, since any one of a number of such devices now available to the trade may be used in connection with an eye bolt or pin such as 23A.

It will have appeared that the service drop anchoring assembly as thus far described, provides an extremely rugged, permanently dependable, built-in assembly for the purpose noted, and that because of the built-in construction the uncertainties in anchorage obtained by drilling through from the outside of the wall structure, are eliminated. It will further appear that the strain due to long secondary service connections in engagement, say with the insulators 24, and the windage effects on such service conductors, are all adequately resisted by a low-cost easily installed structure, the holding power of which is limited only by the strength of the building wall structure. It will have appeared also that the device as described serves fully to attain each and all of the several objects hereinabove stated.

Although the invention has been described by making detailed reference to a preferred embodiment or embodiments, such detail of description is to be understood solely in a descriptive, and not in a limiting sense, due to the many changes which may be made in the parts and their combinations within the scope of the claims hereunto appended.

I claim as my invention:

1. In an anchorage device for electric service conductors, in combination with vertical studding elements of a frame building wall structure, an element in the form of a metal strap and of a length sufficient for bridgingly engaging a pair of spaced wall studs, means securing the strap to a pair of such studs, the strap including a drop center portion of appreciably less length than the normal spacing between adjacent stud elements, the drop center provided with a row of openings for insulator pins, the strap being so formed and located with respect to the wall studding, as to lie entirely between spaced planes coincident with opposite edges of the studding and with the drop center portion spaced somewhat inwardly from the sheathing elements of the wall.

2. In a device of the general type and for the purpose noted, and in combination with vertical wall studding of a building wall structure, a pair of drop center straps mounted to bridge adjacent wall studding elements in supported relation thereto, a primary anchorage element bridging said straps, and being of drop-center form, said straps and anchorage element being so shaped as, when assembled to the studding, to lie between spaced planes of the opposite edges of the studding elements, the primary anchorage element being provided with one or more openings for the reception of pins for insulators or the like, the openings being located so that such pins may extend substantially horizontally or depthwise and outwardly of the wall structure.

3. In a service-drop anchorage for attachment in built-in relation to a building wall structure characterized by vertical studding elements, a pair of secondary supporting straps in bridging relation to adjacent vertical stud elements of the wall, a primary mounting strap bridging the said secondary straps, and provided with a row of openings for insulator pin elements, the ends of the primary strap being apertured and each of the secondary straps provided with a row of mating apertures for the reception of bolts or like holding elements, the openings in the several elements being spaced and arranged to permit, selectively, a vertical mounting and any of a plurality of angle mountings of the primary strap on the secondary straps, whereby to provide for selective angle or vertical mounting of the conductors exteriorly of the wall structure.

4. In a building service-drop anchorage and in combination with the wall of a building structure characterized by wall studding elements, a strap or bar structure spanning a pair of spaced wall stud elements and secured thereto, the bar structure being provided with a row of spaced pin openings for the reception of insulator bolts or pins extending depthwise of the wall, the bar structure being of drop center form, in which the drop center portion is slightly less in length than the spacing between adjacent stud elements, and its center portion dropped or offset to a depth not exceeding the greatest transverse dimension of the studding elements, whereby the bar structure lies entirely between the spaced planes of the inner surfaces of spaced wall portions secured to the studding elements.

FREDERICK H. LUECKE.